United States Patent
Huang et al.

(10) Patent No.: US 9,018,336 B2
(45) Date of Patent: Apr. 28, 2015

(54) POLYMER OF SULFONATED POLY(ARLENE ETHER)S AND MANUFACTURING METHOD THEREOF

(71) Applicant: National Sun Yat-sen University, Kaohsiung (TW)

(72) Inventors: Wen-yao Huang, Kaohsiung (TW); Chun-Che Lee, Kaohsiung (TW); Hsu-feng Lee, Kaohsiung (TW); Steven Holdcroft, Burnaby (CA)

(73) Assignee: National Sun Yat-sen University, Kaohsiung (TW)

( * ) Notice: Subject to any disclaimer, the term of this patent is extended or adjusted under 35 U.S.C. 154(b) by 0 days.

(21) Appl. No.: 14/164,209

(22) Filed: Jan. 26, 2014

(65) Prior Publication Data
US 2015/0031849 A1    Jan. 29, 2015

(30) Foreign Application Priority Data
Jul. 25, 2013 (TW) .............................. 102126756 A

(51) Int. Cl.
*C08G 75/23* (2006.01)
(52) U.S. Cl.
CPC ...................................... *C08G 75/23* (2013.01)
(58) Field of Classification Search
USPC ............ 528/125, 171, 295, 220, 27, 373, 370
See application file for complete search history.

(56) References Cited

PUBLICATIONS

Miyatake et al. J. Am. Chem. Soc. 2007, 129, 3879-3887.*

* cited by examiner

*Primary Examiner* — Shane Fang
(74) *Attorney, Agent, or Firm* — Mark M. Friedman

(57) ABSTRACT

A polymer of sulfonated poly(arylene ether)s (PAEs) and a manufacturing method thereof are provided. A main structure of the PAEs has a first side formed by multi-phenyl glycol monomer and a second side formed by multi-phenyl dihalo monomer with an electron-withdrawing group. The glycol monomer and the dihalo monomer are reacted with each other by a nucleophilic displacement reaction, so as to form the main structure of the PAEs. A film made of the PAEs has a better size stability under a high water uptake.

3 Claims, 6 Drawing Sheets

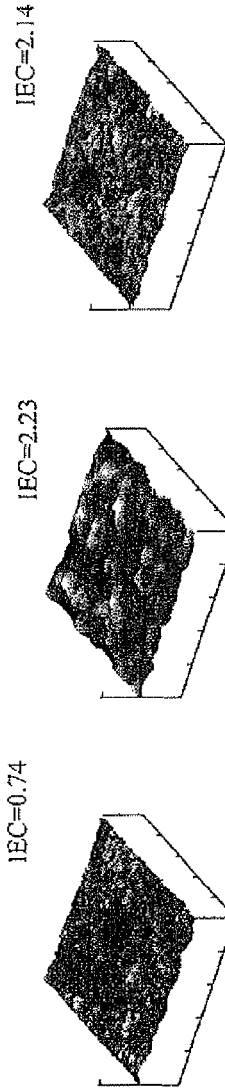
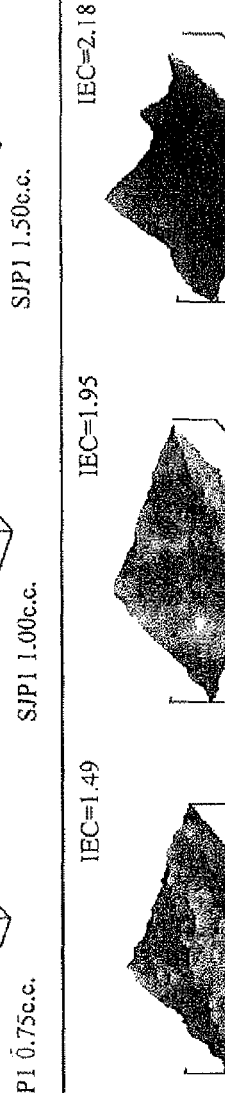
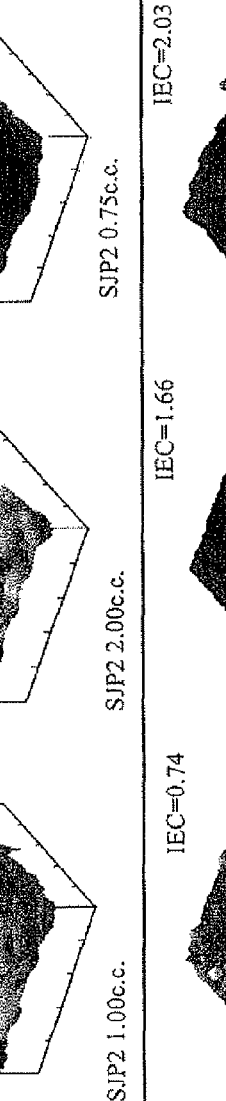
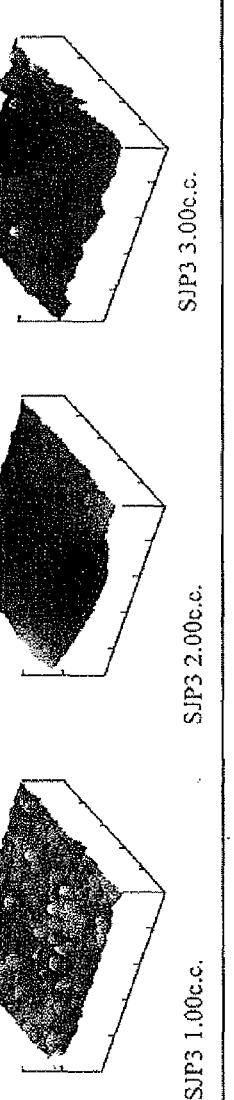
Fig. 4A
Fig. 4B
Fig. 4C

POLYMER OF SULFONATED POLY(ARLENE ETHER)S AND MANUFACTURING METHOD THEREOF

FIELD OF THE INVENTION

The present invention relates to a polymer of poly(arylene ether)s (PAEs) and a manufacturing method thereof, and in particular relates to a polymer of sulfonated poly(acrylene ether)s and a manufacturing method thereof.

BACKGROUND OF THE INVENTION

Current commercial plastic materials such as polyethylene terephthalate (PET), polycarbonate (PC), polyethersulfone (PES), polyimide (PI) and the like each of which has advantages of a low cost and light resistance but also has disadvantages such as poor thermal stability or poor absorbent, thus the applications of such plastic materials in electronic engineering are limited.

With respect to these plastic materials, poly(arylene ether) (PAE) is a high performance engineering plastic having good physical properties, such as: 5% weight loss temperature ($Td^{5\%}$) at 493° C., high glass transition temperature (Tg) at 223° C., high plasticity, high chemical resistance, and good thermal stability, but its water uptake, water-oxygen penetration, the degree of crystallization, the transmittance of visible light area, and other features still require appropriate improvements. Polyethers are generally polymerized by dihalo monomer or dinitro monomer with bisphenoxides to form a polymer. In addition, sulfone or ketone groups have good nucleophilic replacement activity to aromatic halides, so that (poly(aryl ether sulfone)) or (poly(aryl ether ketone)) is common, and heterocyclic and a compound with amide groups can also be used as a polymerization active group to synthesize a PAE with high molar mass.

PAE plastic material is used mostly in insulating film and membrane gas separation, a fluorine-containing polymer is especially useful to provide a low dielectric constant and low water uptake, in which the six-fluorine groups on the side chain of the polymer also help to increase the solubility of the polymer (generally called the fluorine effect), and the huge group ($CF^{3-}$) with electronegativity will increase the free volume of the polymer, thus improving physical and chemical properties of the polymer, such as gas permeability and electrical insulation, etc.

Further, in order to achieve a higher thermal stability, the design of the molecule adopts a less polar phenyl unit for substitution; it has a high conversion rate and a high molecular weight, and the glass transition temperature is about 250~280° C. A polymer containing a pyridine and thiophene has a glass transition temperature about 70° C.~80° C. lower than the average glass transition temperature of a polymer formed by a common monomer. This is due to the different catenation angles. The other influence on the glass transition temperature is the structure of bisphenol. In general, a polymer containing a huge fluorine group has a higher glass transition temperature; a polymer containing a softer group, such as bisphenol-A (BPA), has a relatively low glass transition temperature.

Currently, a traditional synthesis method of PAE comprises a step of proceeding a polymerization reaction of a glycol monomer having steric structure with a phenyl unit with low polarization, such as dihalo or dinitro monomer polyether, wherein the step has advantages for forming cross-linked network of the polymer during the nucleophilic displacement reaction to improve the thermal stability, reduce dielectric constant and water uptake. Therefore, due to the chemical and physical properties of PAE plastics, a PAE with steric structure is a highly functional and mechanical material for plastic film.

The proton exchange membrane belongs to the solid-state electrolyte. Although it is different from the aqueous electrolyte in the voltaic cell, it also has functions similar to the electrolyte solution which can pass positive and negative ions, as it is a conductor. The main function of the proton exchange membrane is to transmit protons, and such polymers in the fuel cell are the most important elements, and directly affect the performance and life of the fuel cell. The requirements of the film are as follows: (a) a good proton transmission capacity (high ion exchange capacity, a uniform microphase separation); (2) able to be isolated from the fuel (gas or methanol) contacts; (3) the catalyst layer in close contact with the film (a good adhesion); and (4) have sufficient mechanical strength and heat tolerance.

The current development of solid-state polymer electrolytes is listed as follows:

1. Perfluorinated Polymer:

PFSA, the proton exchange membrane which is sold commercially (Nafion; DuPont), the series model represents the differences in thickness. Since PFSA has a structure similar to that of the main chain of Teflon, it can provide good mechanical properties, making its life span up to 60,000 hours, and its proton conductivity is up to 0.10 S/cm. The diffusion of methanol in such films still has a serious impact; cells short circuit easily. In addition, the expensive price and high-temperature intolerance are also its shortcomings, and the material still has many possibilities for improvement. Moreover, when the ion exchange capacity (IEC) is high, it means that the concentration of the sulfonic acid ($SO_3H^-$) is high, too. The proton channel is increased, so the conductivity is also increased. However, the drawback is that the concentration of the sulfonic acid in the polymer film will directly affect the nature of the film. It is possible to convert the film into a hydrophilic film to cause a hard formation of the film and easy hydrolysis.

2. PFSA Material Modification:

The commercial Nafion is modified to reduce the diffusion of methanol, which can be used as a proton exchange membrane in the methanol fuel cell.

3. Andoxo-Acids Membrane:

A polymer with basic groups (such as ether, alcohol, imine, amide imide group) is added to a strong acid (such as sulfuric acid or phosphoric acid) to form a complex, wherein the acids and bases form hydrogen bonds. This type of proton exchange membrane has a high thermal stability, proton conductivity, mechanical strength, and flexible characteristics, and it is mainly used for high temperature proton exchange membranes. The film theoretically has an excellent nature at a low degree of acidification, but the acidification concentration is increased for high proton conductivity so that the nature is damaged. Thus, the nature of the film and degree of acidification should be balanced.

4. Hydrocarbon Polymer:

The chemical stability and thermal stability of this type of polymer are not as good as Nafion, but the film made of the polymer is cheap. Thus, the disadvantage can be improved upon by the molecular structure and the film can be formed by a normal process.

5. Organic/inorganic hybrid polymer films: Organic/inorganic compounds, for example, amorphous silica modified organic polymer film, are used to achieve the object of high temperature operation, improve the disadvantage of methanol permeability, and promote thermal stability without degrading proton conductivity. The addition of a hydrophilic inorganic compound can increase the capacity of moisture maintenance of the anode. The addition of a conductive inorganic compound can improve proton conductivity. Because an inorganic compound is crystalline, an inorganic film has poor mechanical properties. Therefore, an inorganic compound serves as the modifier. First, an organic polymer with good properties is produced, then the polymer would be modified by an inorganic compound to form an organic/inorganic hybrid polymer film applied to the methanol fuel cell. However, the mixing ratio thereof is still a problem for the purpose of use.

Please refer to FIGS. 1A, 1B, 1C, and 1D, which are schematic diagrams for showing the possible structures of the current sulfonated polymer used in a proton exchange membrane, in which the hatched segments represent the hydrophobic segments, and the unmarked segment represents the hydrophilic segments.

The sulfonated polymer shown in FIG. 1A has a linear long chain structure. Although it can be attached with a plurality of sulfonic acid groups, the sulfonic acid groups are not enough. The sulfonated polymer shown in FIG. 1B has a branched main chain structure. Although it can be attached with a plurality of sulfonic acid groups, the proton conductivity thereof is low at high temperatures. The sulfonated polymer shown in FIG. 1C has a linear long chain structure. Although it has more sulfonic acid groups and higher IEC, the mechanical properties and thermal stability are on the low side. The sulfonated polymer shown in FIG. 1D has a linear main chain structure and has a partially dense distribution of the sulfonic acid groups. Therefore, it has relatively better physical and chemical properties required for a proton exchange membrane.

Therefore, if a polymer of sulfonated poly(arylene ether)s and a manufacturing method thereof can be provided using highly steric monomer as a hydrophilic segment, more groups thereof would connect with more sulfonic acid groups. The thermal stability and the glass transition temperature of the polymer of poly(arylene ether)s would be enhanced and a film of the PAE would have good water uptake, size stability, oxidation stability, chemical resistance, mechanical properties, and process stability as well as low-cost production to thus solve the problems and technical issues in the structure and production of the above conventional sulfonated polymers.

SUMMARY OF THE INVENTION

A primary object of the present invention is to provide a polymer of sulfonated poly(arylene ether)s (PAEs) and the manufacturing method therefor, wherein the main structure of the PAEs has a first side formed by multi-phenyl glycol monomer and a second side formed by multi-phenyl dihalo monomer with an electron-withdrawing group. The glycol monomer and the dihalo monomer are reacted with each other by a nucleophilic displacement reaction, so as to form the main structure of the PAEs. The sulfonic acid groups are distributed densely at a part of the multi-phenyl groups of the glycol monomer to provide hydrophilicity. The electron-withdrawing groups provide protection of the phenyl groups and hydrophobicity. Therefore, the film made of sulfonated PAEs still has a size stability (length×width variation) below 10% (even less than 8%) under a high water uptake (19%~180%). Compared to current sulfonated polymers, the PAEs not only ensure good polymerization, thermal stability, mechanical properties, and conductivity, but also have better size stability.

To achieve the above object, the present invention provides a polymer of sulfonated poly(arylene ether)s having the structure given in the following formula (1):

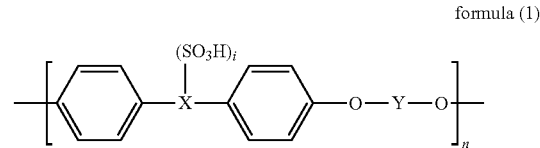

formula (1)

wherein X is

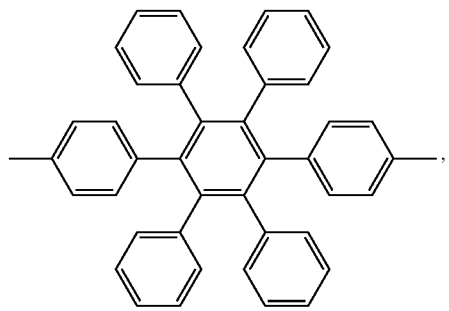

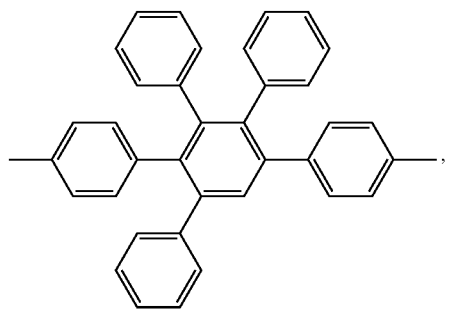

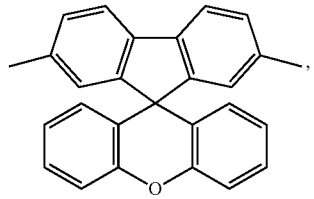

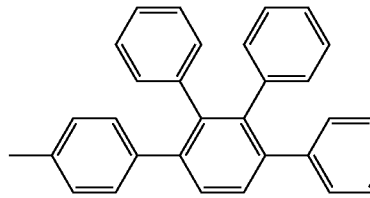

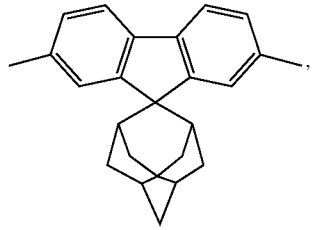

5
-continued
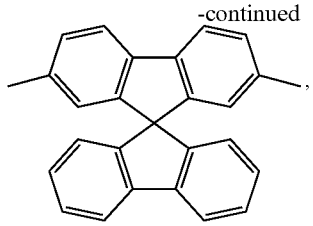
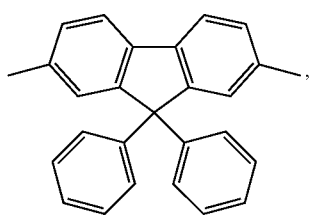
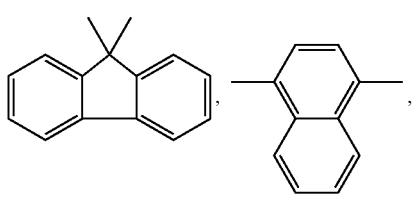
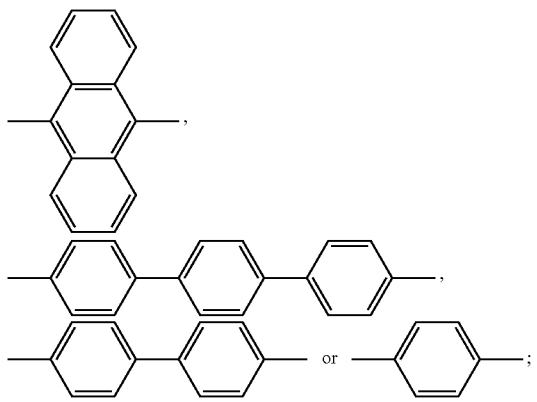
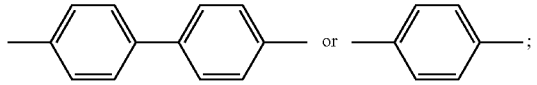
6
Y is selected from
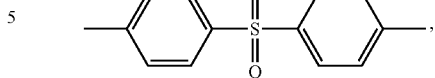
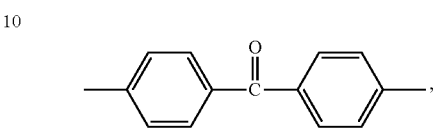
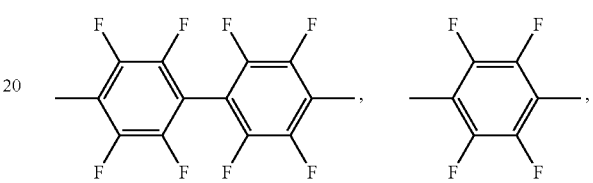
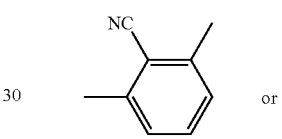
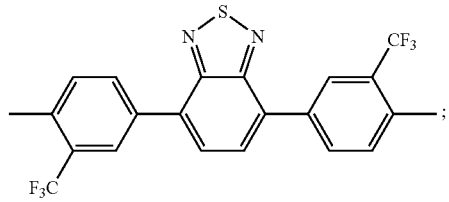
n is an integer greater than or equal to 2; and i is an integer between 1 and 10.
In one embodiment of the present invention, the sulfonated poly(arylene ether)s is selected from:
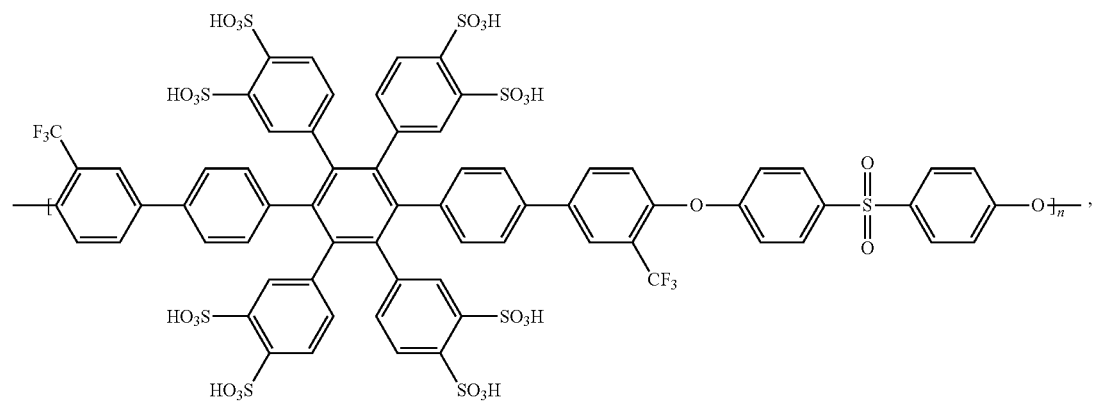

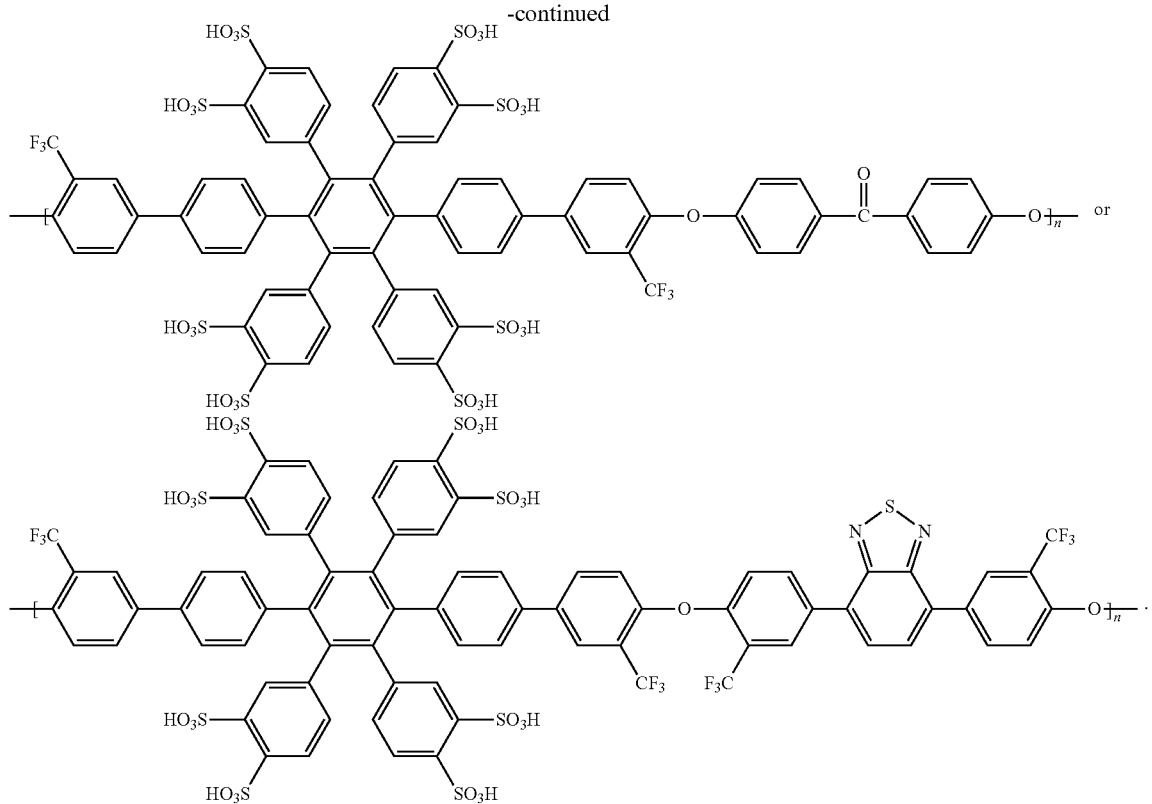

In one embodiment of the present invention, the polymer of sulfonated poly(arylene ether)s is coated to form a thin film which is used as a proton exchange membrane and applied to a fuel cell system.

Furthermore, the present invention provides a manufacturing method for a polymer of sulfonated poly(arylene ether)s, comprising the steps of:

(S01) providing a multi-phenyl glycol monomer which has the structure given in the following formula (I):

formula (I)

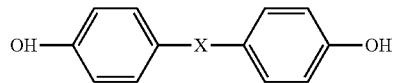

wherein X is

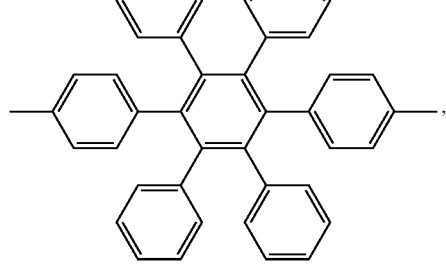

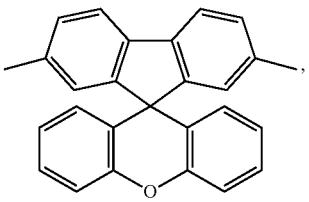

-continued

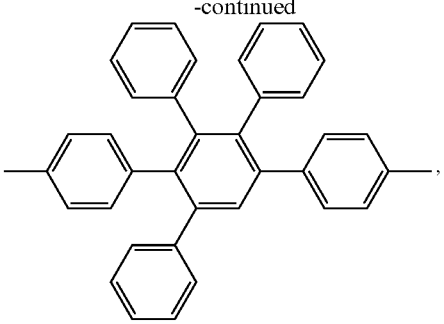

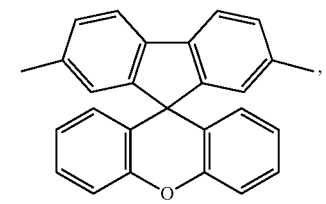

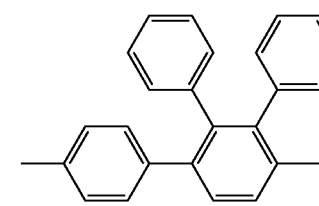

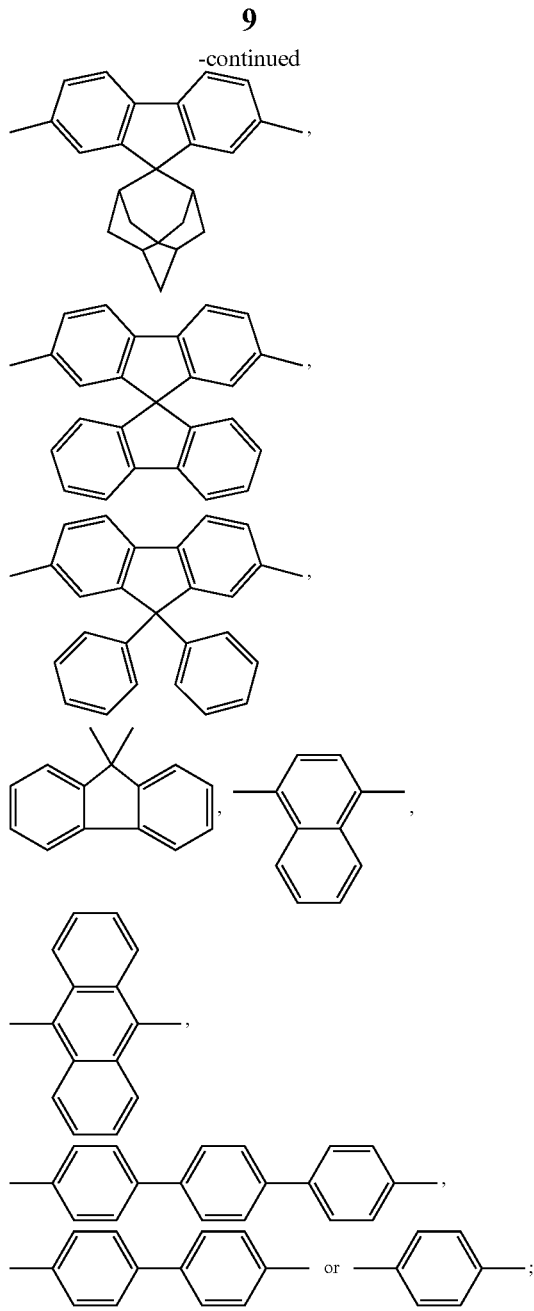

(S02) providing a multi-phenyl dihalo monomer having the structure given in the following formula (II):

Ha-Y-Ha      (II)

wherein Ha is selected from fluorine (F), chlorine (Cl) or bromine (Br), Y is selected from

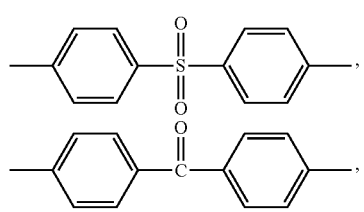

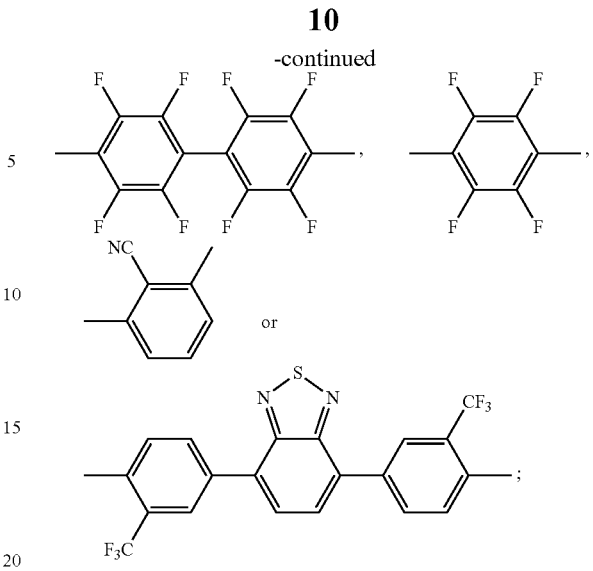

(S03) forming a polymer of poly(arylene ether)s by a nucleophilic displacement reaction from the multi-phenyl glycol monomer and the multi-phenyl dihalo monomer, which has the structure given in the following formula (III):

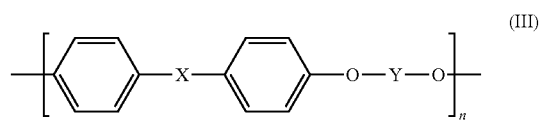

wherein n is an integer greater than or equal to 2; and (S04) carrying out a sulfonation modification of the polymer of poly(arylene ether)s to form a polymer of sulfonated poly(arylene ether)s having the following formula (IV):

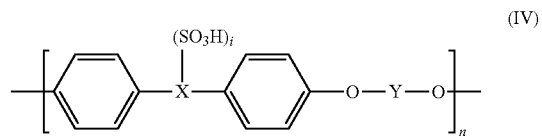

wherein i is an integer between 1 and 10.

In one embodiment of the present invention, the step (S04) is to dissolve the polymer of poly(arylene ether)s in dichloromethane and then add trimethylsilyl chlorosulfonate under a nitrogen atmosphere to continue the sulfonation modification, followed by addition of sodium methoxide for removing the protection of silicon to form a sodium sulfonate, and the reaction product is collected after the reaction, acidified with hydrochloric acid, followed by being separated and dried to obtain the sulfonated poly(arylene ether)s.

In one embodiment of the present invention, after the step (S04), further comprising a step (S05) of dissolving the polymer of sulfonated poly(arylene ether)s in an organic solvent by phase changing, and forming a film by coating.

In one embodiment of the present invention, the film is used as a proton exchange membrane and applied to a fuel cell system.

In one embodiment of the present invention, the polymer of poly(arylene ether)s (III) is selected from:

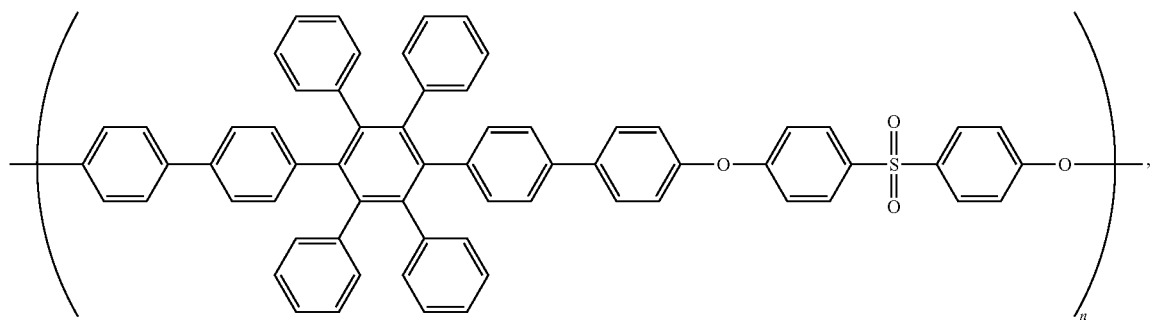
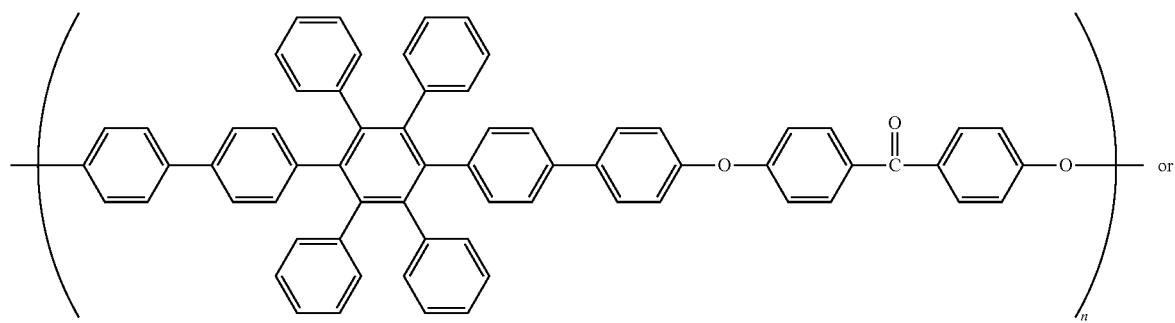
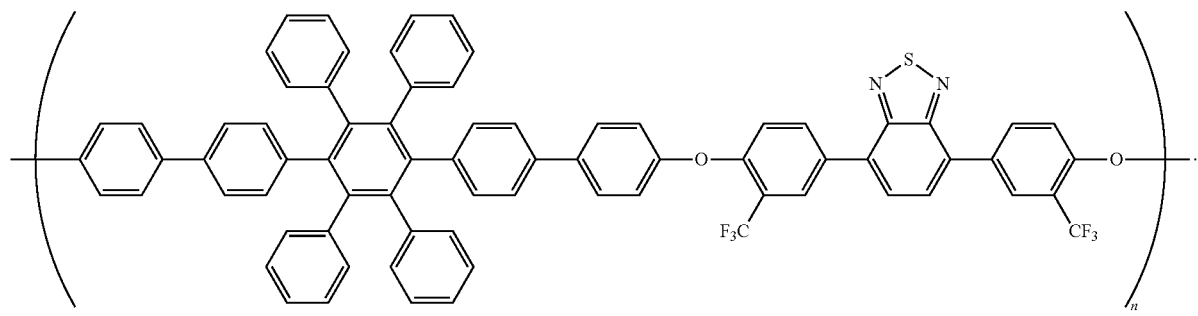
In one embodiment of the present invention, the polymer of sulfonated poly(arylene ether)s (III) is selected from:
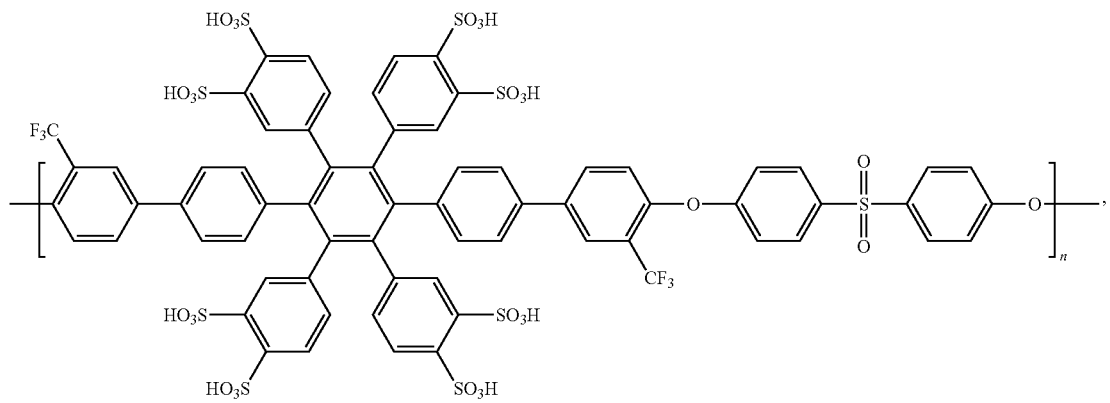

-continued

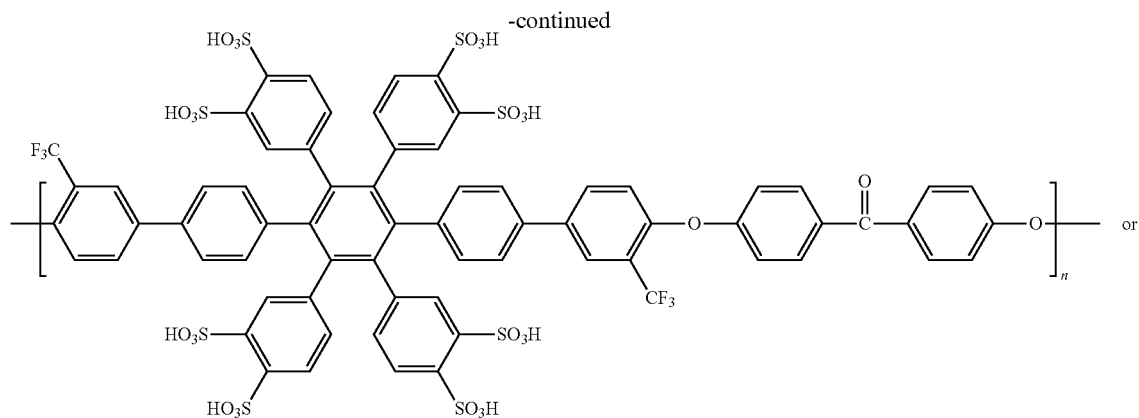

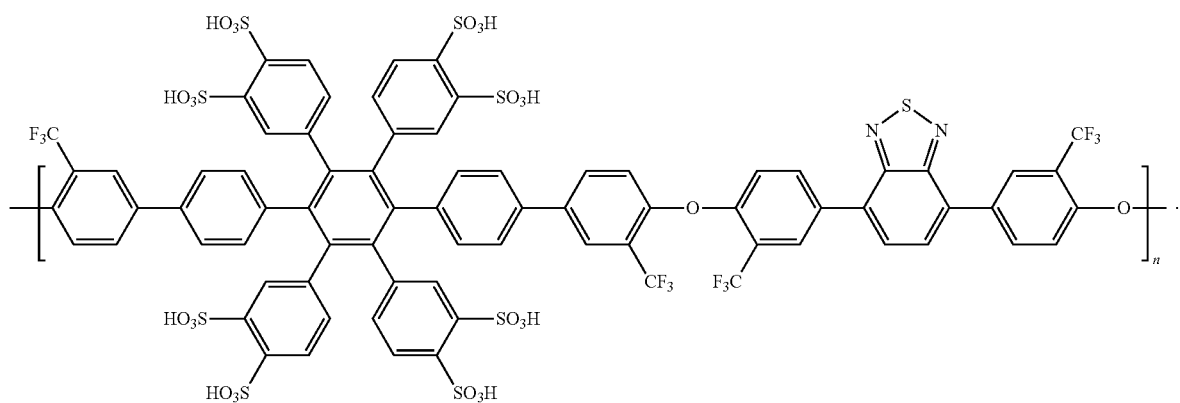

DESCRIPTION OF THE DRAWINGS

FIGS. 4A, 4B, and 4C are AFM photos (magnification 500×500 nm) for showing the surface pattern of microphase separation of the sulfonated PAEs (SJP1, SJP2, SJP3) according to the first to the third embodiments.

DETAILED DESCRIPTION OF THE PREFERRED EMBODIMENTS

Figure 1A:
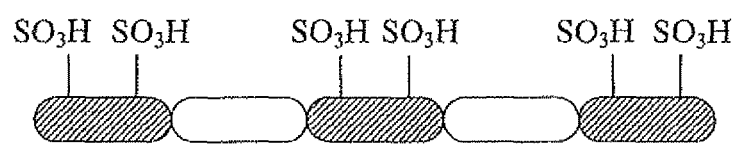
FIGS. 1A, 1B, 1C, and 1D are the diagrams for showing the polymerization structure of current sulfonated polymers in the conventional proton exchange membrane.
Figure 1B:
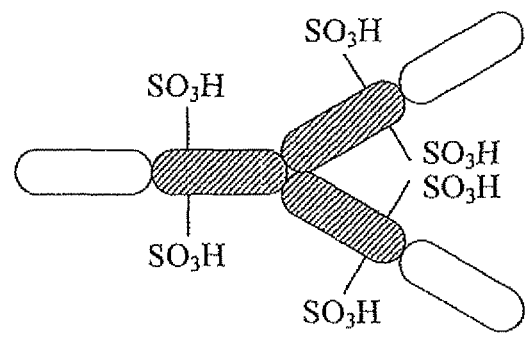
Figure 1C:
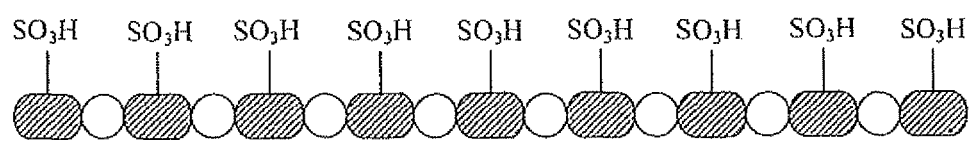
Figure 1D:
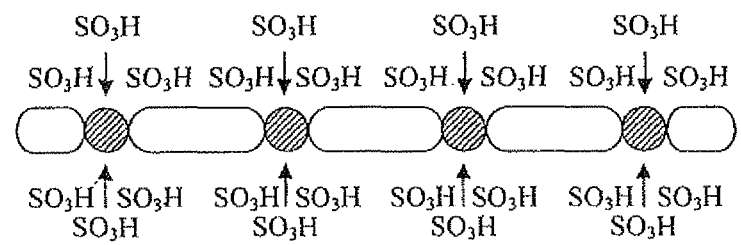

The structure and the technical means adopted by the present invention to achieve the above and other objects can be best understood by referring to the following detailed description of the preferred embodiments and the accompanying drawings.

The present invention provides a polymer of sulfonated poly(arylene ether)s (PAEs), and the sulfonated PAEs has the structure given in the following formula (1):

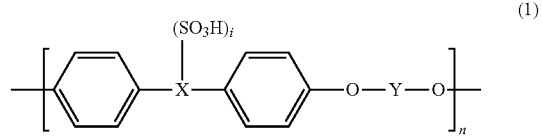

(1)

wherein X is

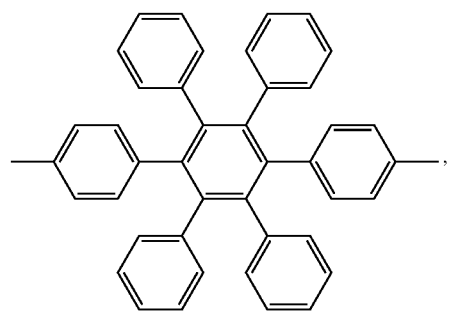

-continued

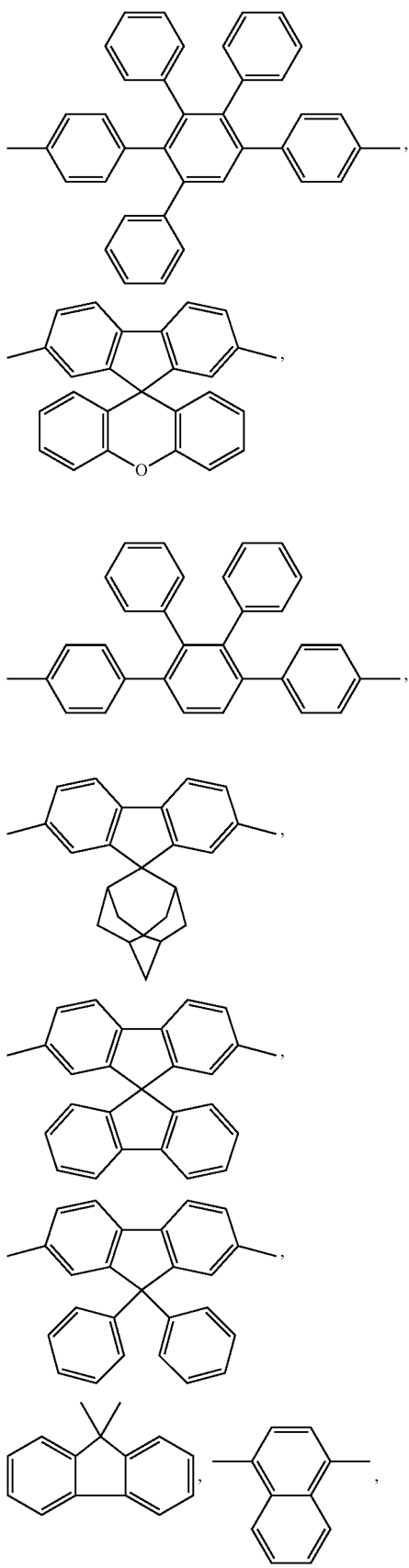

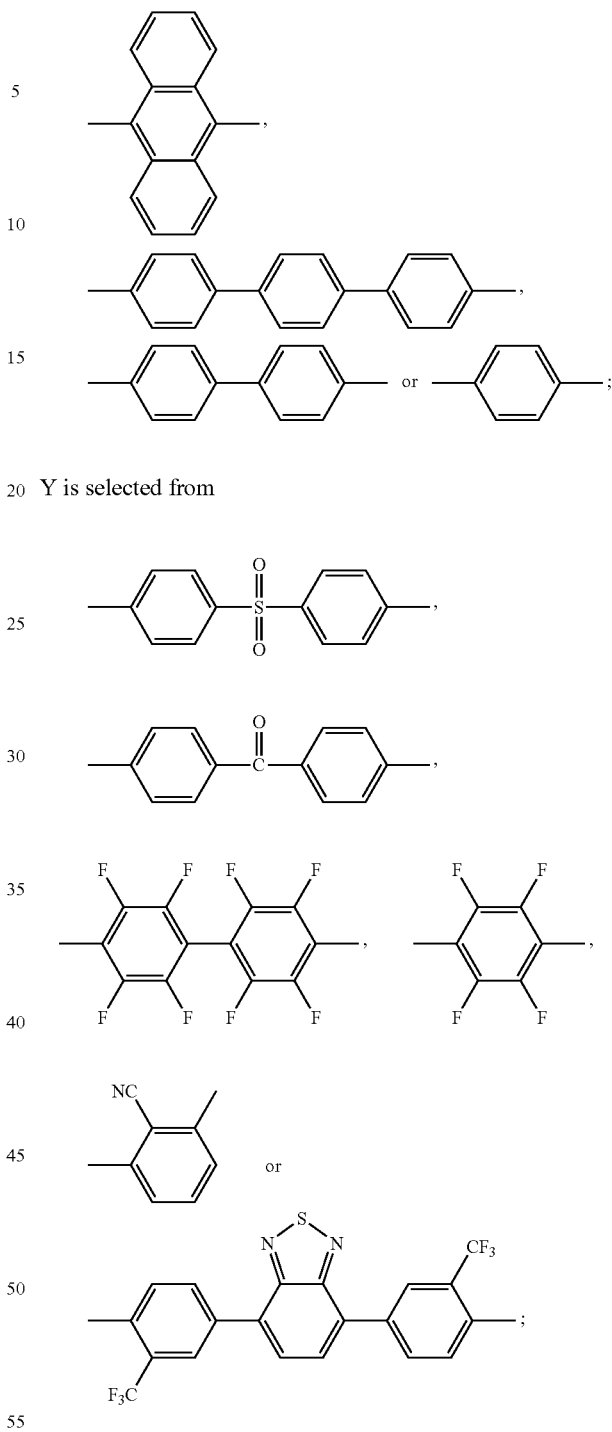

Y is selected from n is an integer greater than or equal to 2; and i is an integer between 1 and 10. The manufacturing method of the above-mentioned sulfonated PAEs will be described in detail with the first to third embodiments.

In the first embodiment of the present invention, a manufacturing method for sulfonated PAEs is provided, which comprises the steps (S01) to (S04):

In the step (S01), first providing the multi-phenyl glycol monomer (or called biphenol monomer), which has the structure given in the following formula (11):

(11)

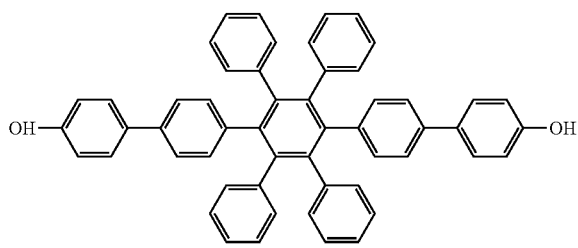

In this step, the present invention, for example, may use 4-bromophenyl acetic acid

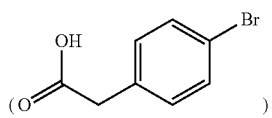

to react in the presence of magnesium oxide (MgO) at 200° C. and an intermediate 1 is obtained:

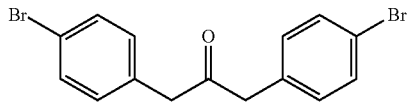 [SMILES: O=C(Cc1ccc(Br)cc1)Cc1ccc(Br)cc1]

wherein the bromo group (Br⁻) of 4-bromophenyl acetic acid can be replaced by a fluoro group (F⁻) or a chloro group (Cl⁻). Subsequently, a mixture of intermediate 1 and benzyl

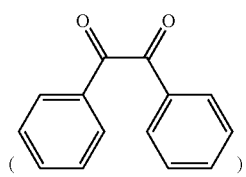 [SMILES: O=C(C(=O)c1ccccc1)c1ccccc1]

react in the presence of benzyltrimethyl ammonium hydroxide of the methanol solution (40 wt %) and triethylene glycol at a temperature of 115° C. to give the intermediate 2:

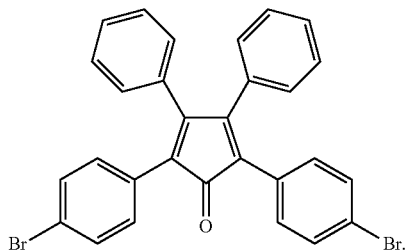 [SMILES: O=C1C(c2ccc(Br)cc2)=C(c2ccccc2)C(c2ccccc2)=C1c1ccc(Br)cc1]

Subsequently, the intermediate 2 and diphenylacetylene

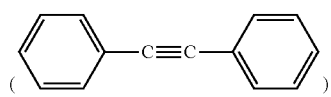 [SMILES: C(#Cc1ccccc1)c1ccccc1]

are mixed in diphenyl ether at a temperature of 220° C. and react to give a multi-phenyl dibromo compound as the intermediate 3:

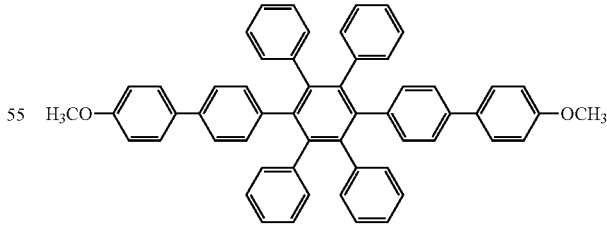

Then, mixing the intermediate 3 and 4-methoxyphenylboronic acid

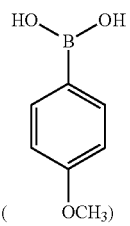

in (dichlorobis[di-tert-butyl (4-dimethylaminophenyl)phosphino]palladium(II)) (A-$^{ta}$Phos)$_2$PdCl$_2$) and 1M potassium carbonate (K$_2$CO$_3$) aqueous solution to react and form an intermediate 4 having multi-phenyl dimethoxy compounds:

Finally, the mixture of intermediate 4 and boron tribromide (BBr$_3$) in an appropriate amount of anhydrous methylene chloride (CH$_2$Cl$_2$) or anhydrous chloroform (CHCl$_3$) as a solvent at a temperature of −78° C. to carry out the reaction, a multi-phenyl glycol monomer having the structure given in formula (11) can be obtained:

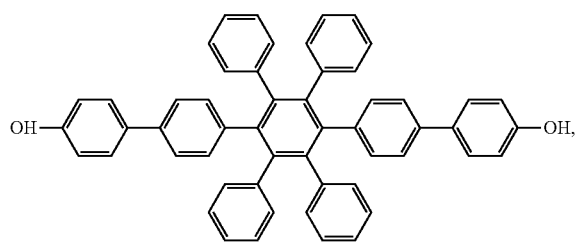 [SMILES: Oc1ccc(-c2ccc(-c3c(-c4ccccc4)c(-c4ccccc4)c(-c4ccc(-c5ccc(O)cc5)cc4)c(-c4ccccc4)c3-c3ccccc3)cc2)cc1]

wherein the above-mentioned boron tribromide ($BBr_3$) may be replaced by boron trifluoride ($BF_3$) or boron trichloride ($BCl_3$).

In the step (S02), a multi-phenyl difluoro monomer 4,4'-Difluorodiphenyl sulfone is provided, which contains two benzene rings and having the structure given in the following formula (12):

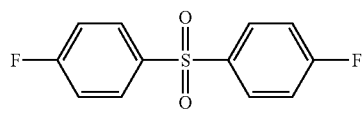
(12)

In this step, the multi-phenyl difluoro monomer may be commercially available directly, and the fluoro group ($F^-$) in the above formula (12) may also be replaced by other halo group ($Ha^-$), e.g., a fluoro group ($F^-$) or a chloro group ($Cl^-$), and therefore the formula may also be summarized as below:

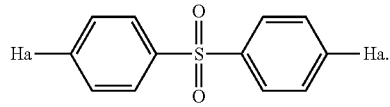

In addition, it is noteworthy that the steps (S01) and (S02) of the present invention may be interchanged or carried out simultaneously.

In the step (S03), the multi-phenyl glycol monomer in the formula (11) and the multi-phenyl difluoro monomer in the formula (12) are reacted with each other by nucleophilic displacement reaction to synthesize a polymer of multi-phenyl poly(arylene ether)s which has the structure given in the following formula (13):

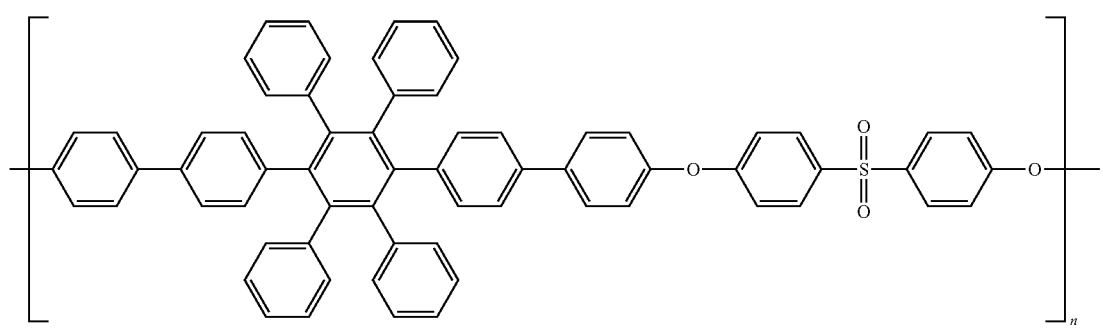
(13)

wherein n is an integer greater than or equal to 2, for example 2, 3, 4, 5, 10, 50, 100 or more.

In this step, the multi-phenyl glycol monomer as in the formula (11), the multi-phenyl difluoro monomer as in the formula (12) and potassium carbonate ($K_2CO_3$) are added to a distillation apparatus, then appropriate amount of toluene and N,N-Dimethylacetamide (DMAc) are added. After the above monomers are dissolved in toluene, removing the toluene at high temperature, and then lowering the temperature to 140° C. for reaction to give the polymer of multi-phenyl poly(arylene ether)s as in the formula (13).

In the step (S04), the sulfonation modification of the polymer of multi-phenyl poly(arylene ether)s as in the formula (13) is carried out to synthesize the polymer of sulfonated multi-phenyl poly(arylene ether)s, which has the structure given in the following formula (14):

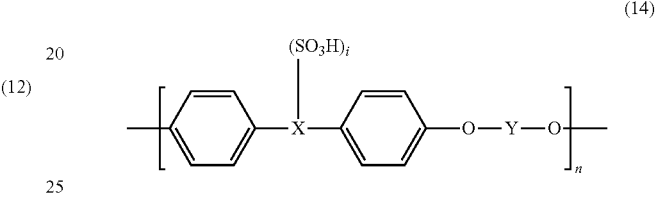
(14)

wherein X is

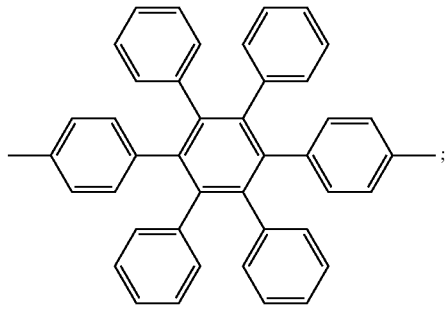

Y is

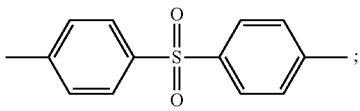

and i is an integer between 1 and 10, for example 1, 2, 4, 6, 8 or 10.

In this step, the polymer of multi-phenyl poly(arylene ether)s as in the formula (13) is dissolved n dichloromethane, and trimethylsilyl chlorosulfonate (TMSCS) was added (e.g., 0.75 cc, 1.0 cc, 1.50 cc of TMSCS) in dropwise under a nitrogen atmosphere for the reaction of sulfonation, followed by addition of sodium methoxide solution for forming sodium sulfonate ($SO_3$—Na) after removing the protection of silicon. Then the product is precipitated with diluted ethanol and filtered, the product is collected after the reaction and acidified by 2M hydrochloric acid (HCl). Subsequently, separating the collected product and drying in vacuum to obtain the polymer of sulfonated multi-phenyl poly(arylene ether)s, for example, the steps of (S01) the same as in the first embodiment, but the second step of the second embodiment is to provide another multi-phenyl difluoro monomer 4,4'-difluorobenzophenone in step (S02), which has the structure given in the following formula (15):

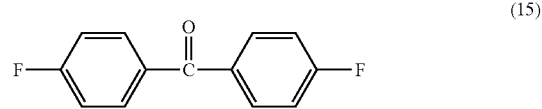

(15)

In this step, the multi-phenyl difluoro monomer may be commercially available directly, and the fluoro group ($F^-$) as in above formula (15) may be replaced by other halo group ($Ha^-$), e.g., a fluoro group ($F^-$) or a chloro group ($Cl^-$), and therefor the formula may also summarized as below:

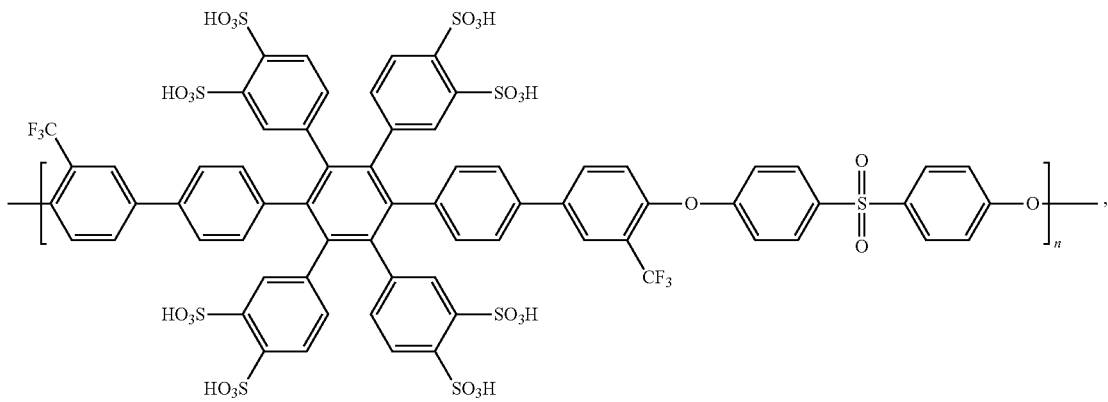

but not limited thereto.

Furthermore, depending on the requirement, the above-mentioned polymer of poly(arylene ether)s according to the present invention may be produced into a suitable form for standby, for example, after the step (S04), a step (S05) is further included for dissolving the polymer of sulfonated poly(arylene ether)s in an organic solvent by phase changing, and coating the polymer on a surface then forming a film after drying, for example to serve as a proton exchange membrane having the solid-state electrolyte and to be applied to a fuel cell system, but it is not limited thereto. It may also be used as other functional films, molecular separation membranes, or materials having proton transmission characteristics.

On the other hand, in the second embodiment of the present invention, a manufacturing method of another polymer of sulfonated poly(arylene ether)s is provided, which comprises

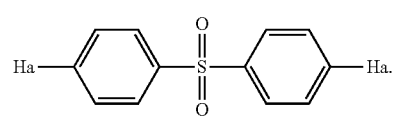

Next, in the step (S03) of the second embodiment in the present invention, the multi-phenyl glycol monomer in the formula (11) and the multi-phenyl difluoro monomer in the formula (15) are reacted with each other by nucleophilic displacement reaction to synthesize a polymer of multi-phenyl poly(arylene ether)s which has the structure given in the following formula (16):

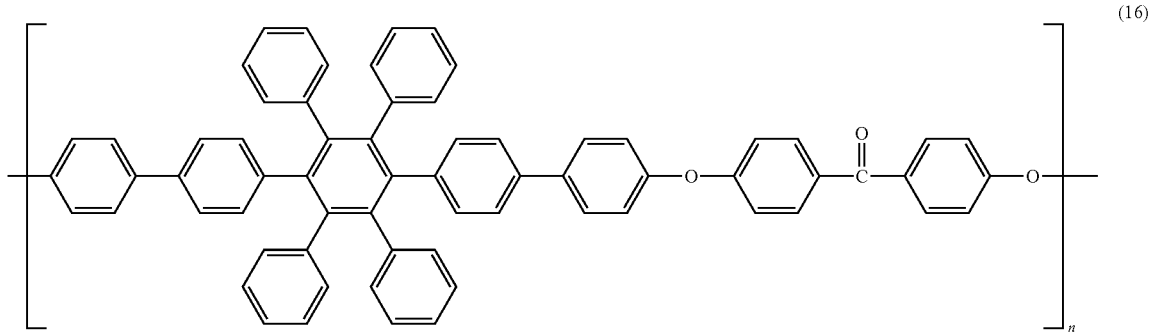

wherein n is an integer greater than or equal to 2, for example 2, 3, 4, 5, 10, 50, 100 or more.

In this step, the multi-phenyl glycol monomer as in the formula (11), the multi-phenyl difluoro monomer as in the formula (15) and potassium carbonate ($K_2CO_3$) are added to a distillation apparatus, then appropriate amount of toluene and N,N-Dimethylacetamide (DMAc) are added. After the above monomers are dissolved in toluene, removing the toluene at high temperature, and then lowering the temperature to 140° C. for reaction to give the polymer of multi-phenyl poly(arylene ether)s as in the formula (16).

In the step (S04) of the second embodiment of the present invention, the sulfonation modification of the polymer of multi-phenyl poly(arylene ether)s as in the formula (16) is carried out to synthesize the polymer of sulfonated multi-phenyl poly(arylene ether)s, which also has the structure given in the following formula (17):

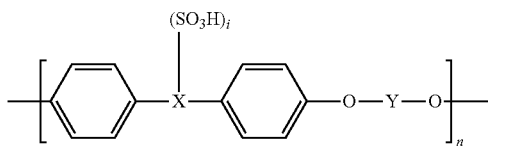

wherein X is

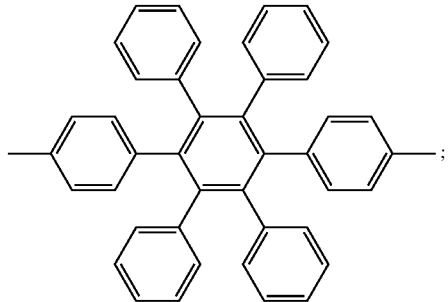

and i is an integer between 1 and 10, for example, 1, 2, 4, 6, 8 or 10; while Y is replaced by

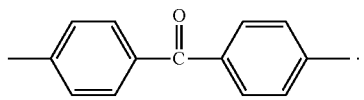

In this step, the polymer of multi-phenyl poly(arylene ether)s as in the formula (16) is dissolved in dichloromethane, and trimethylsilyl chlorosulfonate (TMSCS) was added (e.g., 1 c.c., 2 c.c., 3 c.c. of TMSCS) in dropwise under a nitrogen atmosphere for the reaction of sulfonation, followed by addition of sodium methoxide solution for forming sodium sulfonate ($SO_3$—Na) after removing the protection of silicon. Then the product is precipitated with diluted ethanol and filtered. The product is collected after the reaction and acidified by 2M hydrochloric acid (HCl). Subsequently, separating the collected product and drying in vacuum to obtain the polymer of sulfonated multi-phenyl poly(arylene ether)s, such as

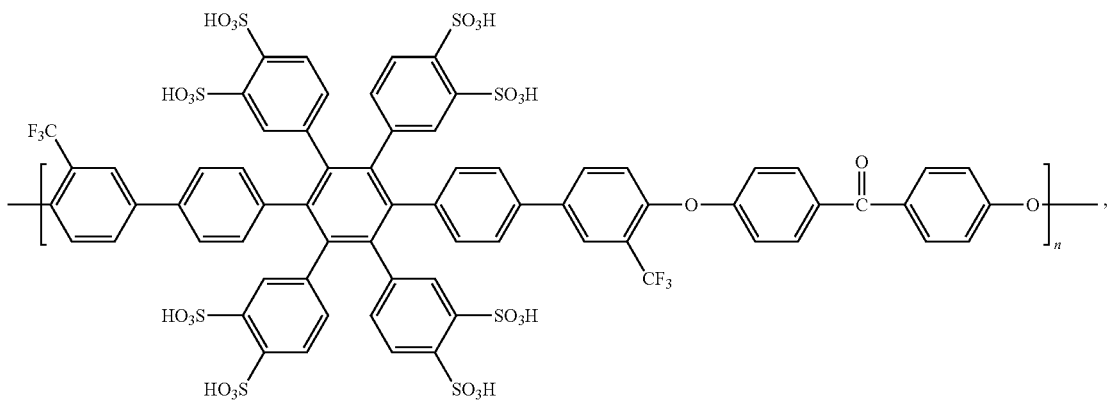

but not limited thereto.

On the other hand, in the third embodiment of the present invention, a manufacturing method of another polymer of sulfonated poly(arylene ether)s is provided, which comprises the steps of (S01) the same as in the first embodiment, but the second step of the third embodiment is to provide another multi-phenyl difluoro monomer which has the structure given in the following formula (18):

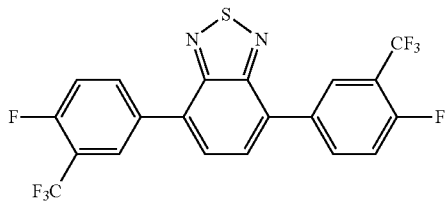

(18)

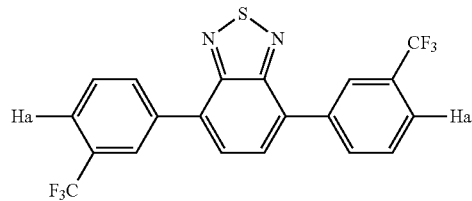

Next, in the step (S03) of the second embodiment in the present invention, the multi-phenyl glycol monomer in the formula (11) and the multi-phenyl difluoro monomer in the formula (18) are reacted with each other by nucleophilic displacement reaction to synthesize a polymer of multi-phenyl poly(arylene ether)s which has the structure given in the following formula (19):

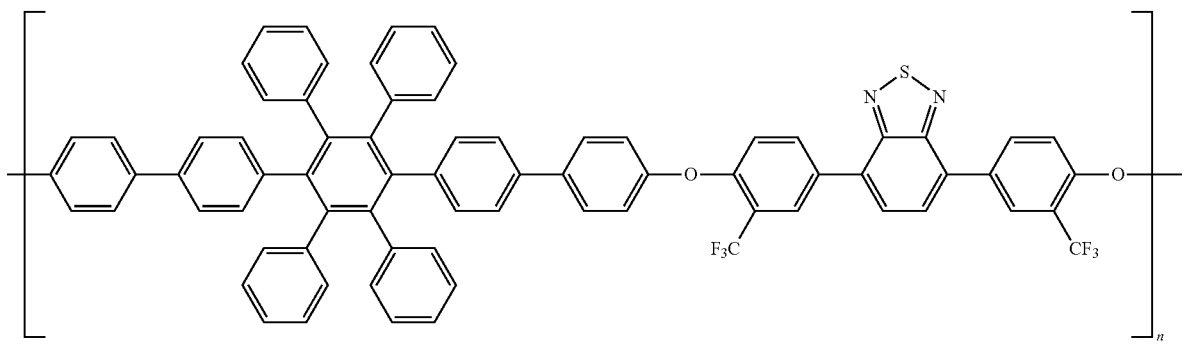

(19)

In this step, the multi-phenyl difluoro monomer may be commercially available directly, and the fluoro group ($F^-$), as in formula (18) above, may be replaced by another halo group ($Ha^-$), e.g., a fluoro group ($F^-$), or a chloro group ($Cl^-$), and therefore the formula may also summarized as below:

wherein n is an integer greater than or equal to 2, for example 2, 3, 4, 5, 10, 50, 100, or more.

In this step, the multi-phenyl glycol monomer as in the formula (11), the multi-phenyl difluoro monomer as in the formula (18) and potassium carbonate ($K_2CO_3$) are added to a distillation apparatus, then appropriate amount of toluene and N,N-Dimethylacetamide (DMAc) is added. After the above monomers are dissolved in toluene, removing the toluene at high temperature, and then lowering the temperature to 140° C. for reaction to give the polymer of multi-phenyl poly(arylene ether)s as in the formula (19).

In the step (S04) of the second embodiment of the present invention, the sulfonation modification of the polymer of multi-phenyl poly(arylene ether)s as in the formula (19) is carried out to synthesize the polymer of sulfonated multi-phenyl poly(arylene ether)s, which also has the structure given in the following formula (20):

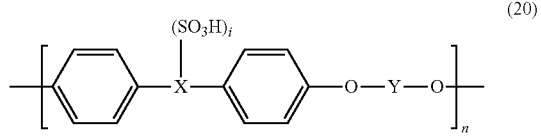

(20)

wherein X is

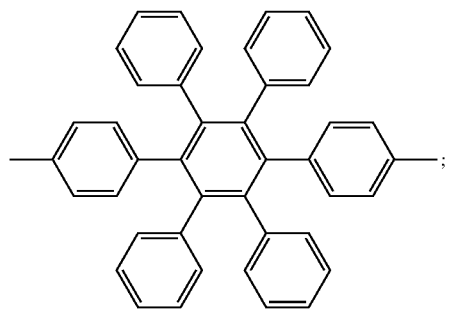

and i is an integer between 1 and 10, for example, 1, 2, 4, 6, 8 or 10; while Y is replaced by

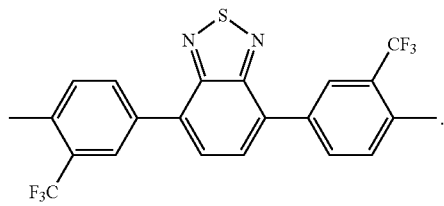

In this step, the polymer of multi-phenyl poly(arylene ether)s as in formula (20) is dissolved in dichloromethane, and trimethylsilyl chlorosulfonate (TMSCS) was added (e.g., 1 c.c., 2 c.c., 3 c.c. of TMSCS) in dropwise under a nitrogen atmosphere for the reaction of sulfonation, followed by addition of sodium methoxide solution for forming sodium sulfonate ($SO_3$—Na) after removing the protection of silicon. Then the product is precipitated with diluted ethanol and filtered, the product is collected after the reaction and acidified by 2M hydrochloric acid (HCl). Subsequently, separating the collected product and drying in vacuum to obtain the polymer of sulfonated multi-phenyl poly(arylene ether)s, such as

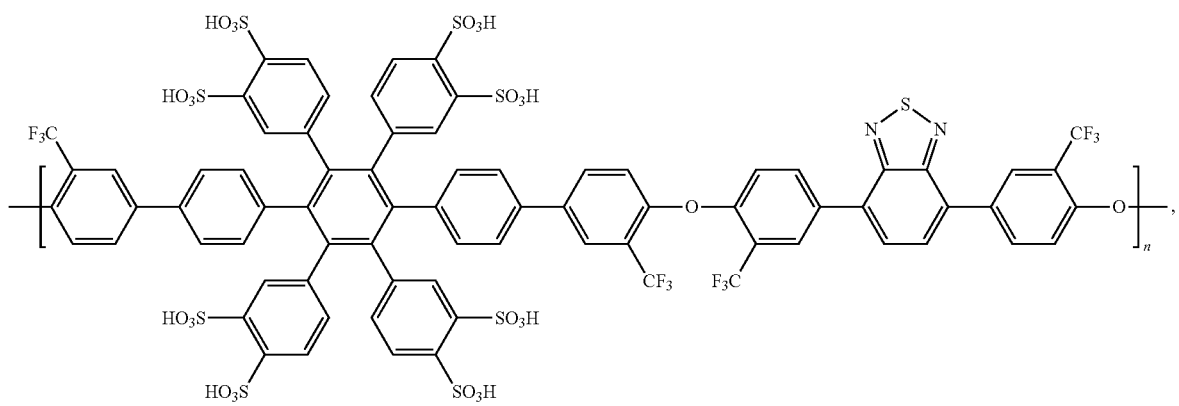

but not limited thereto.

Please refer to the following Table 1, which shows the number average molecular weight (Mn), average molecular weight (Mw), and polydispersity (PDI) of the polymers of poly(arylene ether)s (JP1, JP2, JP3) according to the first to the third embodiments of the present invention before sulfonation.

TABLE 1

| Poly(arylene ether)s | Mn | Mw | PDI |
| --- | --- | --- | --- |
| JP1 | 14,784 | 87,881 | 5.9 |
| JP2 | 17,116 | 115,827 | 6.7 |
| JP3 | 21,488 | 106,871 | 4.9 |

Figure 2A:
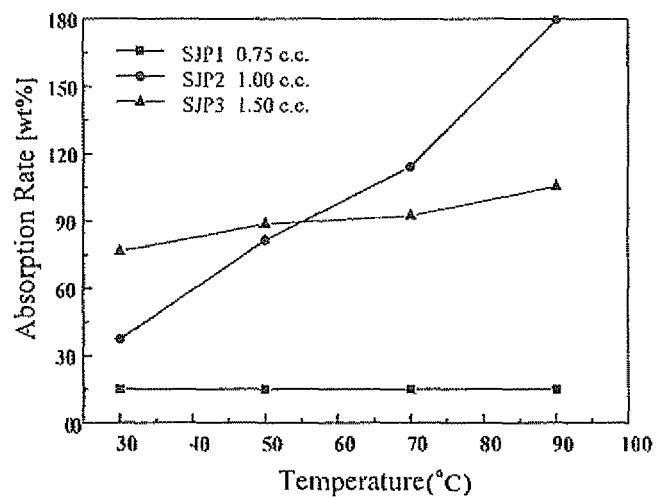
FIGS. 2A, 2B and 2C are the diagrams of the curves for showing temperature and water uptake of the sulfonated PAEs (SJP1, SJP2, SJP3) according to the first to the third embodiments.
Figure 2B:
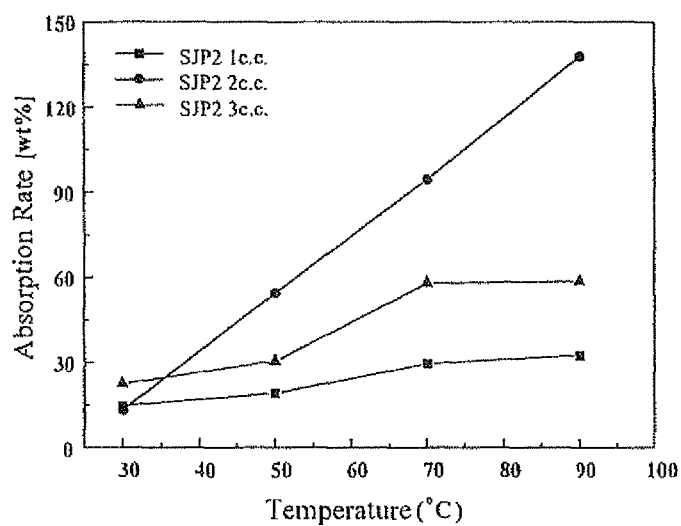
Figure 2C:
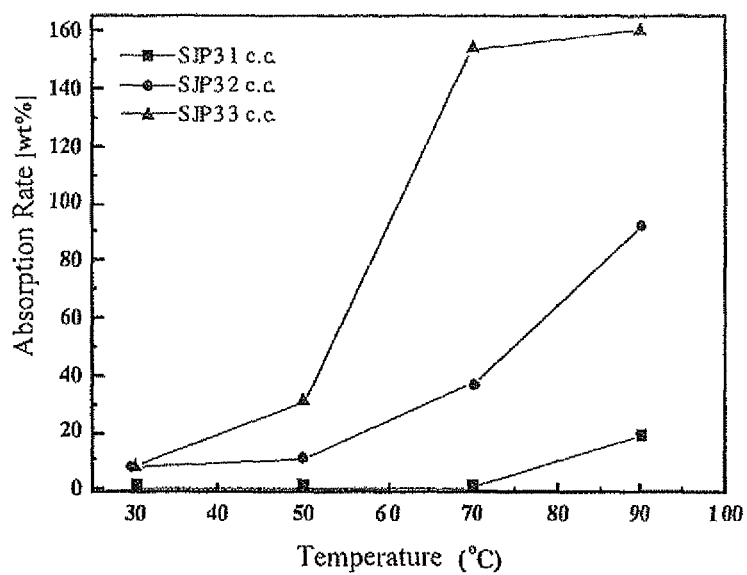
Figure 3A:
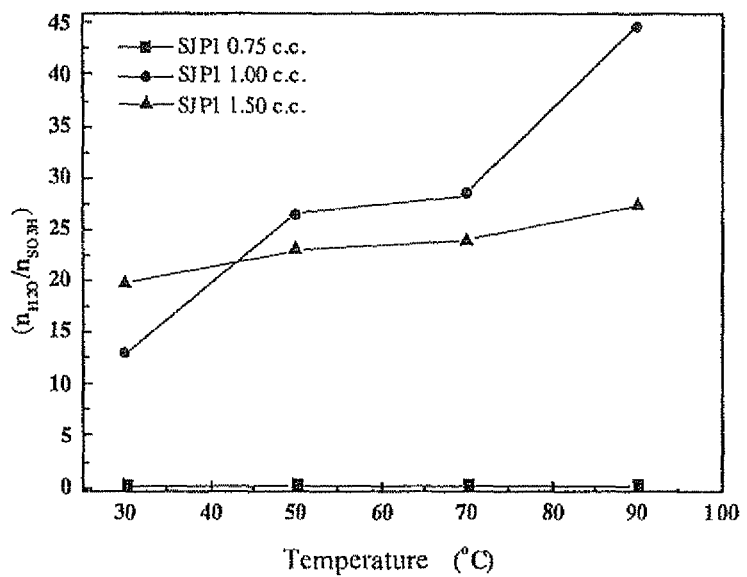
FIGS. 3A, 3B, and 3C are the diagrams of the curves for showing the temperature and the hydration number (λ) of the sulfonated PAEs (SJP1, SJP2, SJP3) according to the first to the third embodiments.
Figure 3B:
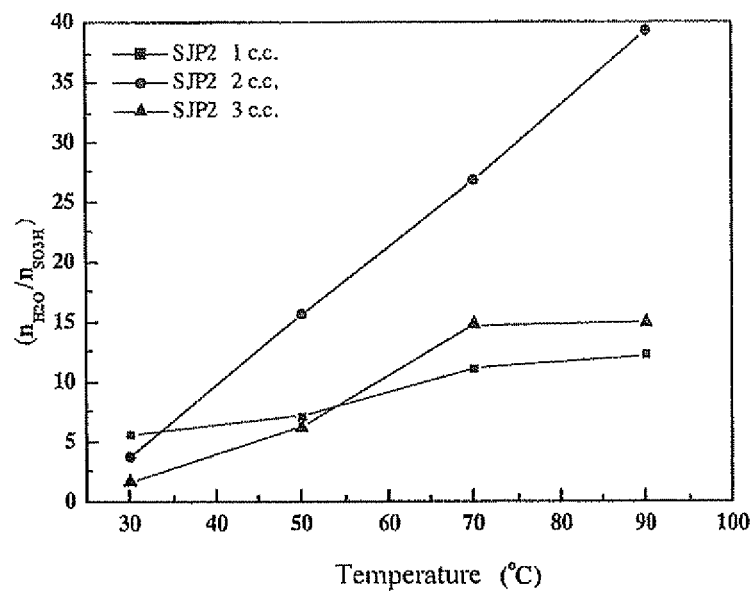
Figure 3C:
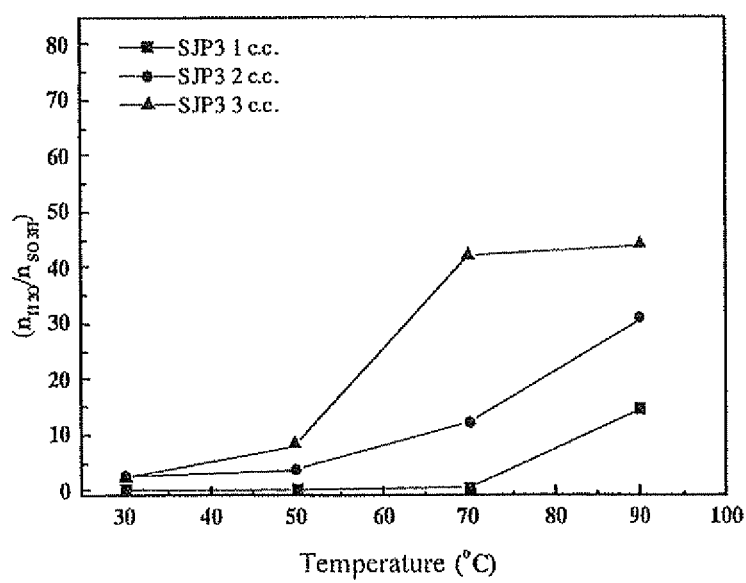

Please refer to FIGS. 2A, 2B, and 2C which show the curves of the temperature and the water uptake measured from the films made of the polymers of sulfonated poly(arylene ether)s (SJP1, SJP2, SJP3) according to the first to third embodiments of the present invention. Also, please refer to FIGS. 3A, 3B, and 3C which show the curves of the temperature and hydration number (λ) measured from the films made of the polymers of sulfonated poly(arylene ether)s (SJP1, SJP2, SJP3) according to the first to third embodiments of the present invention, whereby the consolidation of the water uptake (%), size variation (Δl*Δw, %) and hydration number (λ) as shown in Table 2 are compared with the ion exchange capacity (IEC, mgequivalent/g):

TABLE 2

| Sulfonated PAEs | IEC | Water uptake (%) | Size variation Δl * Δw (%) | Hydration number (λ) |
|---|---|---|---|---|
| SJP1(0.75 c.c) | 0.74 | 0.15% | 0% | 0.11 |
| SJP1(1.00 c.c) | 2.23 | 179.56% | 8% | 44.73 |
| SJP1(1.50 c.c) | 2.14 | 105.45% | 2% | 27.37 |
| SJP2(1.00 c.c) | 1.49 | 32.49% | 0% | 12.11 |
| SJP2(2.00 c.c) | 1.95 | 137.58% | 0% | 39.27 |
| SJP2(3.00 c.c) | 2.18 | 58.57% | 0% | 14.93 |
| SJP3(1.00 c.c) | 0.74 | 19.57% | 0% | 14.69 |
| SJP3(2.00 c.c) | 1.66 | 92.35% | 0% | 30.91 |
| SJP3(3.00 c.c) | 2.03 | 160.51% | 0% | 43.87 |

The above table 2 shows that when the water uptake is up to 100%, the size variation of the films made of sulfonated PAEs of the present invention is still less than 10%. This result shows that the film which is made of sulfonated PAEs according to the present invention and used as the proton exchange membrane will have good size stability. Moreover, when IEC is approximately equal to 2, the hydration number is between 14.93 and 44.73 due to the high water uptake.

In addition, please refer to FIGS. 4A, 4B, and 4C which show the surface pattern of microphase separation of the sulfonated PAEs (SJP1, SJP2, SJP3) according to the first to the third embodiments shot by AFM, in which the dark color represents the hydrophilic groups and bright color represents the hydrophobic groups. Part of the image (such as IEC greater than 2 of SJP1 or SJP3) clearly shows the hydrophilic groups with a dark color evenly distributed within the hydrophobic groups with a bright color. It also shows better microphase separation patterns, i.e. the sulfonic acid groups are interconnected densely to each other like a network structure. Thus, more proton channels would be provided. However, excessive aggregation of part of the sulfonated materials, for example SJP2 (IEC=2.18) and SJP3 (IEC=1.66), are found in the AFM diagram, which shows the relatively poor microphase separation patterns.

In summary, a polymer of sulfonated poly(arylene ether)s (PAEs) provided in the present invention has a first side formed by multi-phenyl glycol monomer (or dihalo monomer) and a second side formed by dihalo monomer (or glycol monomer) having at least two benzene rings with an electron-withdrawing group. The glycol monomer and the dihalo monomer are reacted with each other by a nucleophilic displacement reaction, so as to form the main structure of the sulfonated PAEs. The sulfonic acid groups are distributed densely at part of the multi-phenyl groups of the glycol monomer to provide hydrophilicity. The electron-withdrawing groups provide protection for the phenyl groups and hydrophobicity. Therefore, a film made of sulfonated PAEs still has a size stability (length×width variation) below 10% (even less than 8%) under a high water uptake (19%~180%). Compared to current sulfonated polymers, the sulfonated PAEs not only provides a good polymerization, thermal stability, mechanical properties and conductivity, but also have a better size stability. Meanwhile, because the multi-phenyl core can provide many positions for sulfonation, the sulfonic acid groups are distribute densely at part of the multi-phenyl groups of the glycol monomer. Therefore, the sulfonated PAEs not only have good microphase separation patterns, but the positions of the sulfonic acid groups can be effectively concentrated in order to form the better proton channels for proton transmission.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A polymer of sulfonated poly(arylene ether)s, having the structure given in the following formula (I):

formula (1)

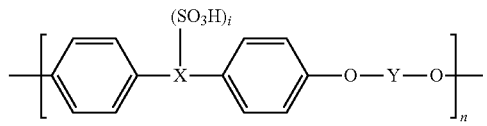

wherein X is;

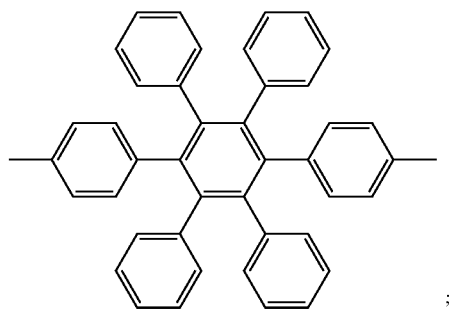

Y is selected from

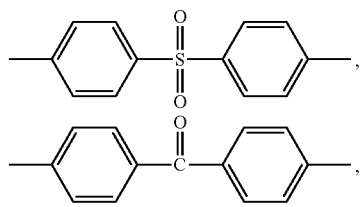

or

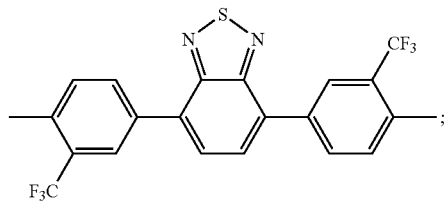

n is an integer greater than or equal to 2; and i is an integer between 1 and 10.

2. The polymer of sulfonated poly(arylene ether)s according to claim 1, wherein the sulfonated poly(arylene ether)s is selected from:

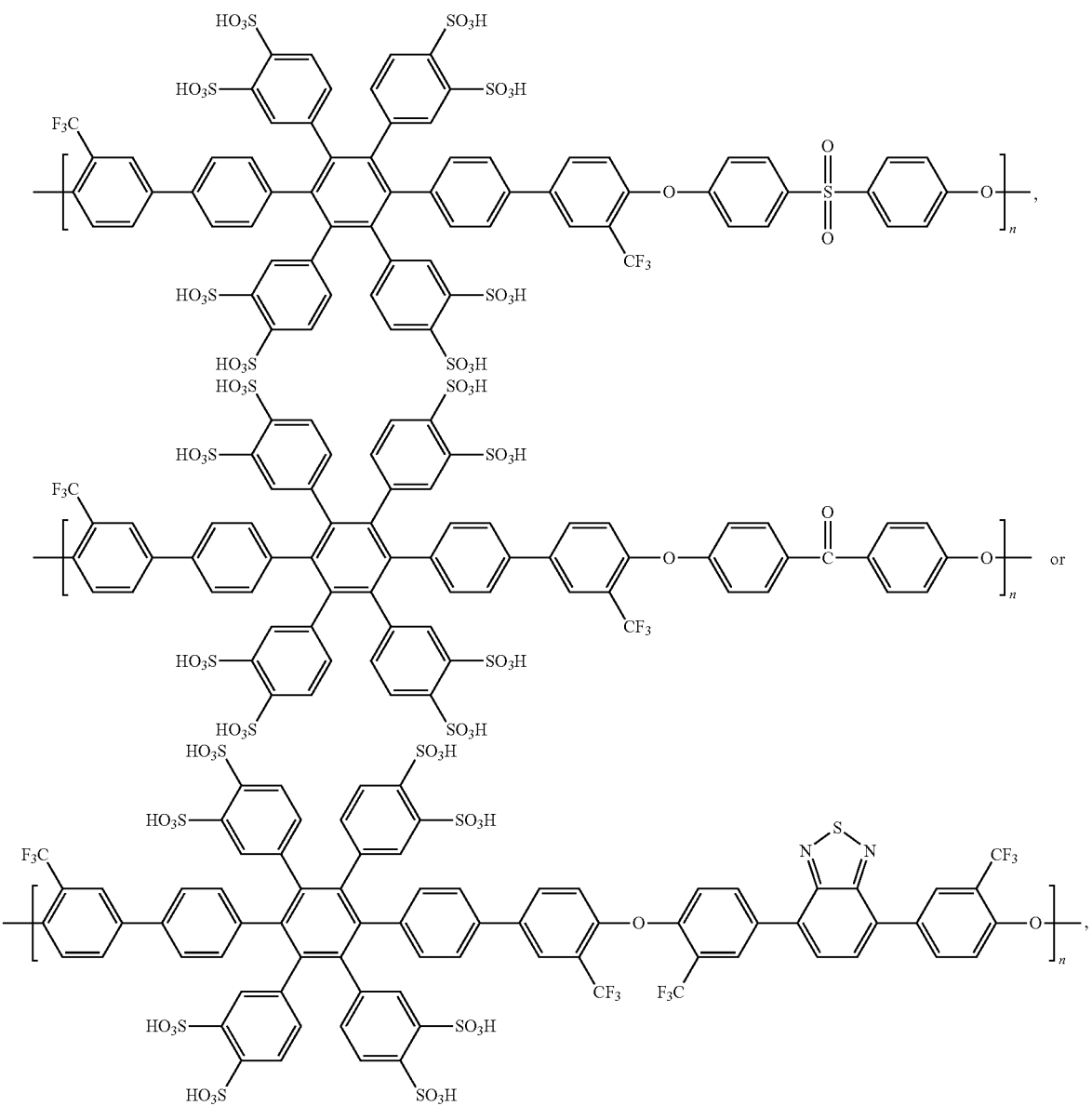
wherein n is an integer greater than or equal to 2.
3. The polymer of sulfonated poly(arylene ether)s according to claim 1, wherein the polymer of sulfonated poly(arylene ether)s is coated to form a thin film which is used as a proton exchange membrane and applied to a fuel cell system.
* * * * *

UNITED STATES PATENT AND TRADEMARK OFFICE
CERTIFICATE OF CORRECTION

Page 1 of 1

PATENT NO. : 9,018,336 B2
APPLICATION NO. : 14/164209
DATED : April 28, 2015
INVENTOR(S) : Huang et al.

It is certified that error appears in the above-identified patent and that said Letters Patent is hereby corrected as shown below:

On the Title Page, Item (72), should read:

-- (72) Inventors: Wen-yao Huang, Kaohsiung (TW); Chun-Che Lee, Kaohsiung (TW); Hsu-feng Lee, Kaohsiung (TW); Steven Holdcroft, Burnaby (CA); Benjamin Britton, Burnaby (CA). --.

Signed and Sealed this
Twenty-first Day of July, 2015

Michelle K. Lee
*Director of the United States Patent and Trademark Office*